(12) United States Patent
Harmon

(10) Patent No.: US 10,920,856 B2
(45) Date of Patent: Feb. 16, 2021

(54) COMMODITY METERING SYSTEM FOR WORK VEHICLE WITH TRANSVERSE DRIVE FOR METERING ELEMENT

(71) Applicant: Deere & Company, Moline, IL (US)

(72) Inventor: Andrew W. Harmon, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 164 days.

(21) Appl. No.: 16/169,690

(22) Filed: Oct. 24, 2018

(65) Prior Publication Data

US 2020/0132164 A1 Apr. 30, 2020

(51) Int. Cl.
| | | |
|---|---|---|
| *F16H 1/16* | (2006.01) | |
| *A01C 15/00* | (2006.01) | |
| *F16D 1/10* | (2006.01) | |
| *A01C 7/08* | (2006.01) | |

(52) U.S. Cl.
CPC .............. *F16H 1/16* (2013.01); *A01C 15/006* (2013.01); *F16D 1/101* (2013.01); *A01C 7/08* (2013.01); *F16D 2001/102* (2013.01)

(58) Field of Classification Search
CPC ..... F16H 1/16; F16H 1/12; F16H 1/04; F16H 1/02; F16H 1/00; A01C 15/006; A01C 15/005; A01C 15/00; A01C 7/08; A01C 7/00; F16D 1/101; F16D 1/10; F16D 1/00; F16D 2001/102
See application file for complete search history.

(56) References Cited

U.S. PATENT DOCUMENTS

| | | |
|---|---|---|
| 5,845,818 A | 12/1998 | Gregor et al. |
| 5,996,515 A | 12/1999 | Gregor et al. |
| 2016/0205867 A1* | 7/2016 | Montag ................ A01C 15/003 |
| 2017/0055437 A1 | 3/2017 | Thompson |
| 2017/0273235 A1 | 9/2017 | Kordick |

OTHER PUBLICATIONS

European Search Report issued in European Patent Application No. 19203857.8 dated Mar. 24, 2020, in 8 pages.

* cited by examiner

*Primary Examiner* — Christopher J. Novosad
(74) *Attorney, Agent, or Firm* — Klintworth & Rozenblat IP LLP

(57) ABSTRACT

A work vehicle includes an actuator, a metering element, and a powertrain configured to transmit power from the actuator to the metering element to drive the metering element in rotation about a first axis to meter a commodity at a predetermined rate. The powertrain includes an actuator output member supported for rotation about a second axis. The powertrain includes a metering input member that is fixed for rotation with the metering element about the first axis. The actuator output member is engaged with the metering input member for power transmission from the actuator output member to the metering input member. The first axis is transverse to the second axis.

20 Claims, 8 Drawing Sheets

COMMODITY METERING SYSTEM FOR WORK VEHICLE WITH TRANSVERSE DRIVE FOR METERING ELEMENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and implements, and more specifically, to a commodity metering system for a work vehicle with a transverse drive for a metering element.

BACKGROUND OF THE DISCLOSURE

Seeding work vehicles, such as air carts/seeders and other seeding devices are configured for applying seed, fertilizer, and/or other commodities to a field. The work vehicle may be operatively connected to tilling equipment, soil-opening and closing implements, etc. for applying the commodity under the surface of the soil.

Seeding work vehicles typically include one or more tanks and a metering system that meters out a predetermined quantity of the commodity from the tank as the work vehicle moves across the field. The metering system may include a plurality of metering elements, such as metering rollers that are configured to meter out the commodity from the tank at a predetermined rate.

Current metering systems may have limited usefulness in certain operating conditions. Also, metering systems may be too bulky, overly complicated, contain an excessive amount of parts, have low manufacturability, and/or suffer from other disadvantages.

SUMMARY OF THE DISCLOSURE

This disclosure provides an improved commodity metering system for a work vehicle. This disclosure also provides methods for operating the same.

In one aspect, the disclosure provides a work vehicle that includes an actuator and a metering element. The work vehicle also includes a powertrain configured to transmit power from the actuator to the metering element to drive the metering element in rotation about a first axis and to meter a commodity at a predetermined rate. The powertrain includes an actuator output member supported for rotation about a second axis. Furthermore, the powertrain includes a metering input member that is fixed for rotation with the metering element about the first axis. The actuator output member is engaged with the metering input member for power transmission from the actuator output member to the metering input member. The first axis is transverse to the second axis.

In another aspect, the disclosure provides a work vehicle with a metering system. The metering system includes a plurality of metering elements that are coaxial with respect to a first axis. The metering elements are supported for rotation about the first axis to meter out a commodity from the metering system. The work vehicle also includes an actuator system with a plurality of actuators. The actuators are operably connected to respective ones of the plurality of metering elements. The actuator system is configured to independently actuate the plurality of metering elements.

In a further aspect, the disclosure provides a work vehicle that includes an actuator system with a plurality of actuators. The work vehicle also includes a metering system with a support structure and a cartridge assembly that is removably attached to the support structure. The cartridge assembly is moveable between an engaged position and a disengaged position relative to the support structure. The cartridge assembly includes a plurality of metering elements supported for rotation about a first axis to meter out a commodity from the metering system. The work vehicle additionally includes a plurality of powertrains that operably connect the plurality of actuators to respective ones of the metering elements for power transfer from the plurality of actuators to the respective metering elements. At least one of the plurality of powertrains includes a first connector supported by the cartridge assembly and a second connector supported by the support structure. The first connector and the second connector are engaged in the engaged position. The first connector and the second connector are disengaged in the disengaged position.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
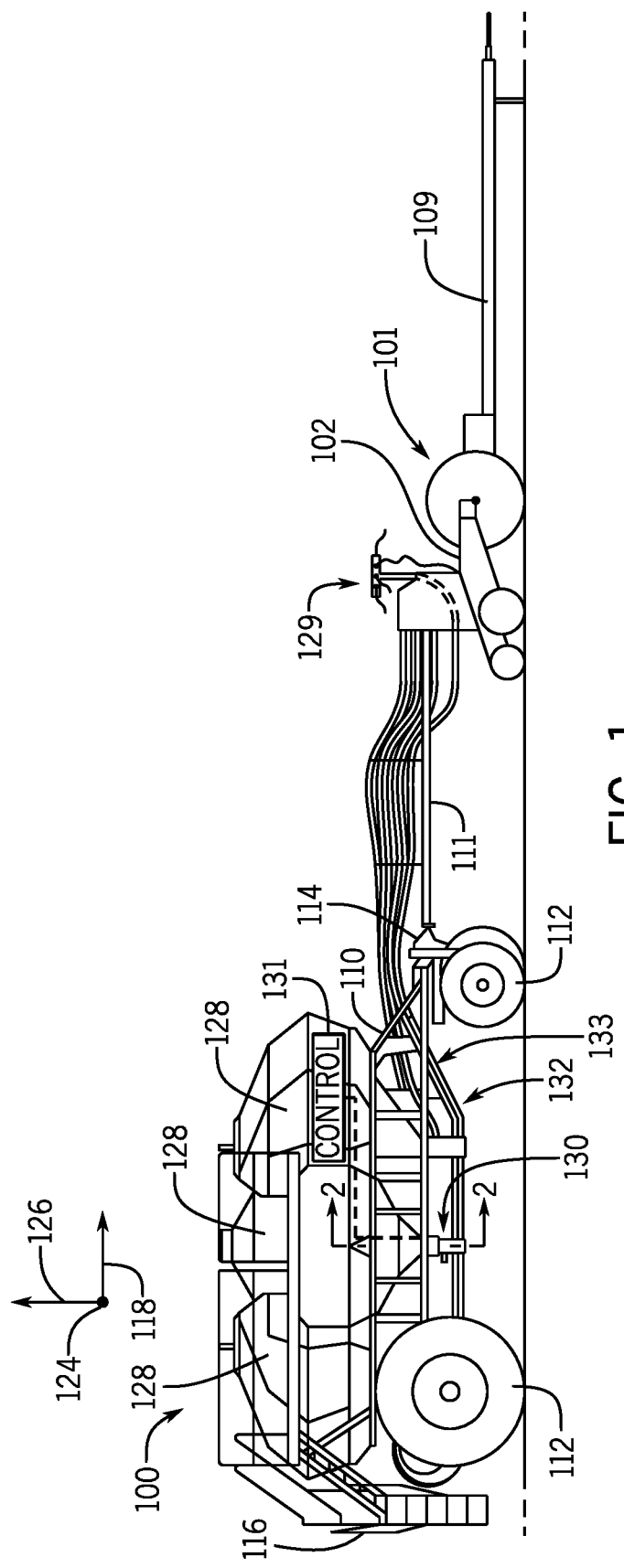
FIG. 1 is a side view of a work vehicle with a metering system according to example embodiments of the present disclosure.

The following describes one or more example embodiments of a commodity metering system for a work vehicle (e.g., an air cart, commodity cart, etc.), its control system(s), and the methods for operating the same, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

The following describes one or more example implementations of the disclosed work vehicle metering system for metering a commodity at a predetermined rate for delivery to the soil, as shown in the accompanying figures of the drawings described briefly above. The work vehicle may include a metering system with a plurality of metering elements. The metering elements may comprise metering rollers in some embodiments. The metering rollers may actuate (rotate) independent of each other and at variable output speeds in some embodiments.

The work vehicle may also include an actuator system with a plurality of actuators, such as electric motors. The actuators may be operably connected to respective ones of the metering rollers via a respective powertrain (e.g., via a geartrain). Furthermore, the work vehicle may include a control system configured to control the actuators for individual and independent actuation of the metering rollers.

The work vehicle may additionally include a delivery system. The delivery system may include a plurality of tubes, pipes, lines, etc., each with a passage that receives the metered commodity from the metering system. Air may flow through the passages and carry the commodity away from the work vehicle and eventually to the soil. In some embodiments, at least part of the passages may substantially extend along a primary axis of the work vehicle (e.g., substantially parallel to the direction of travel).

In some embodiments, the metering rollers may rotate about a lateral axis (i.e., horizontal and perpendicular to the primary axis. This arrangement may make the metering system more compact. It also may provide more flexibility in the types and configurations of metering rollers that can be incorporated within the system. Also, this arrangement may facilitate maintenance of the metering system.

The powertrain that operatively connects the actuator to the metering roller may include a series of shafts, gears, screws, or rotating components that are enmeshed in series. The powertrain may establish a power flow path for power transfer from the actuator to the metering roller.

The powertrain may also include components that turn the power delivery path transversely. For example, the powertrain may include a drive that includes a first shaft and a second shaft that are engaged via meshing gears, gear teeth, threading, etc. Power may be delivered via the drive from the actuator to the metering roller. The first shaft may rotate about a first axis of rotation. That power may be transferred to the second rotating shaft for rotating it about a second axis of rotation. The power delivery path may turn transversely from the first axis to the second axis. The first and second axes may be disposed transverse (e.g., perpendicular) relative to each other. The drive may comprise a worm drive, a spiroid drive, a hypoid drive, a spiral bevel drive, a bevel-type drive, or other similar drive. This configuration allows the metering system to be more compact. Also, the metering system may include relatively few parts. Moreover, manufacturability may be enhanced due to this configuration.

Furthermore, the powertrain may include one or more features that facilitate metering system maintenance, reconfiguration, and the like. For example, the metering rollers may be supported as a unit that is removably attached to a support structure. The powertrain may include a joint having an engaged position and a disengaged position. In the engaged position, the powertrain may connect the actuator to the metering roller for power delivery. In contrast, in the disengaged position, the powertrain may disconnect the power delivery path. In some embodiments, the joint may be selectively moved between the engaged position and the disengaged position. Also, in some embodiments, the joint may include a biasing member that biases the joint toward the engaged position.

FIG. 1 illustrates a work vehicle 100 according to example embodiments of the present disclosure. In the illustrated embodiment, the work vehicle 100 may be towed by another vehicle, such as a tractor (not shown). In other embodiments, the work vehicle 100 of the present disclosure may be a self-propelled vehicle. In some embodiments, the work vehicle 100 may be an air cart or air drill that contains a bulk amount of a commodity, that meters out the commodity from the bulk amount, and that moves the metered commodity away from the work vehicle 100 for planting in the ground. The work vehicle 100 shown in FIG. 1 is merely an example embodiment of the present disclosure. One or more features of the present disclosure may be included on a different work vehicle, such as a planter, a commodity cart, or other work vehicle without departing from the scope of the present disclosure.

A longitudinal axis 118 (i.e., primary axis) is indicated in FIG. 1 for reference purposes. The longitudinal axis 118 may be substantially parallel to a direction of travel of the work vehicle 100. Thus, the longitudinal axis 118 may be parallel to a fore-aft axis of the work vehicle 100. A lateral axis 124 is also indicated in FIG. 1. The lateral axis 124 may be perpendicular to the longitudinal axis 118 and may extend horizontally between opposite lateral sides of the work vehicle 100. Furthermore, a vertical axis 126 is indicated in FIG. 1 for reference purposes.

The work vehicle 100 may be configured for delivering the commodity to one or more row units 101. Each row unit 101 may include features for respectively tilling the soil, opening a furrow in the soil, depositing the commodity into the furrow, and closing the furrow. In some embodiments, the row units 101 may be connected together by a row unit frame 102 that extends substantially along the lateral axis 124. There may be a plurality of row units 101 spaced apart and arranged in series on the row unit frame 102 along the lateral axis 124. Thus, although only one row unit 101 is shown in FIG. 1, it will be appreciated that similar row units 101 may be included and disposed in series along the lateral axis 124. The row unit frame 102 may be connected to the work vehicle 100 via a rear tow bar 111. The row unit frame 102 may also be connected to the towing vehicle (e.g., tractor) via a forward tow bar 109. Accordingly, the row units 101 may be disposed between the work vehicle 100 and the towing vehicle with respect to the longitudinal axis 118. However, the row units 101 may be disposed behind the work vehicle 100 in some embodiments and/or the row units 101 may be directly connected to the work vehicle 100 (i.e., directly connected to the frame of the work vehicle 100) without departing from the scope of the present disclosure.

As shown in FIG. 1, the work vehicle 100 may include a frame 110 (i.e., chassis) and a plurality of wheels 112. The frame 110 may be assembled from rigid beams, bars, brackets, or other structures and may support the components described in detail below. The wheels 112 may support the frame 110 on terrain and enable movement of the vehicle 100 across the terrain. As shown, the frame 110 may extend between a front end 114 and a rear end 116 of the work vehicle 100. The tow bar 111 may extend from the frame 110 at the front end 114 for attaching the work vehicle 100 to the row unit frame 102.

The work vehicle 100 may further include one or more commodity containers 128 (tanks, vessels, etc.). The containers 128 may be supported on the frame 110. The commodity containers 128 may contain seed, fertilizer, and/or another particulate or granular commodity. There may be any number of containers 128. In the illustrated embodiment, for example, there are three commodity containers 128.

Additionally, the work vehicle 100 may include at least one metering system 130. The metering system 130 may be a volumetric metering system. The metering system 130 may be configured to receive commodity from the commodity container 128 and may meter commodity to a downstream component. In some embodiments, the metering system 130 may be supported by the frame 110 and may be disposed generally underneath the commodity container(s) 128. The work vehicle 100 may include individual components of the metering system 130 for different commodity containers 128 in some embodiments. During operation, particles of the commodity within one of the containers 128 may move vertically downward toward the metering system 130. The metering system 130 may operate to meter out the commodity from the container 128 at a controlled rate as the vehicle 100 moves across the field.

The work vehicle 100 may also include a delivery system 132. The delivery system 132 may include a plurality of delivery tubes 133 (i.e., lines, pipes, etc.). The tubes 133 may include rigid segments as well as flexible segments. The tubes 133 may be supported by the frame 110 and may extend from the work vehicle 100. At least a portion of the tubes 133 may extend substantially along the longitudinal axis 118. The tubes 133 may conduct a flow of air from the rear end 116 to the front end 114 and away from the work vehicle 100 in some embodiments. Airflow within the tubes 133 may be generated by a fan or other source mounted on the vehicle 100. The tubes 133 may be fluidly connected to the metering system 130 such that particles of the commodity (metered out by the metering system 130) may be received by the tubes 133. In some embodiments, the particles may move vertically downward into the tubes 133. Once in the tubes 133, the air stream therein may propel the metered particles away from the work vehicle 100 and toward the row units 101. In some embodiments, the tubes 133 may be connected to a manifold 129, which divides the flow of commodity between different row units 101. It will be appreciated, however, that the delivery system 132 may be configured differently without departing from the scope of the present disclosure.

Moreover, the work vehicle 100 may include a control system 131. The control system 131 may include and/or communicate with various components of a computerized device, such as a processor, a data storage device, a user interface, etc. The control system 131 may be in communication with and may be configured for controlling the metering system 130, the delivery system 132, and/or other components of the work vehicle 100. The control system 131 may be wholly supported on the work vehicle 100, or the control system 131 may include components that are remote from the vehicle 100. The control system 131 may be in electronic, hydraulic, pneumatic, mechanical, or other communication with the metering system 130, the delivery system 132, etc.

During operation of the work vehicle 100 (e.g., when towed by a tractor or other towing vehicle), the control system 131 may control the metering system 130 (e.g., by controlled actuation of one or more motors or other actuators), which allows a controlled quantity of particles to pass into the delivery system 132 at a predetermined rate. The metered commodity may flow through the delivery system 132 to the manifold 129, which then distributes the commodity to the different row units 101 for planting within different rows in the soil.

Figure 2:
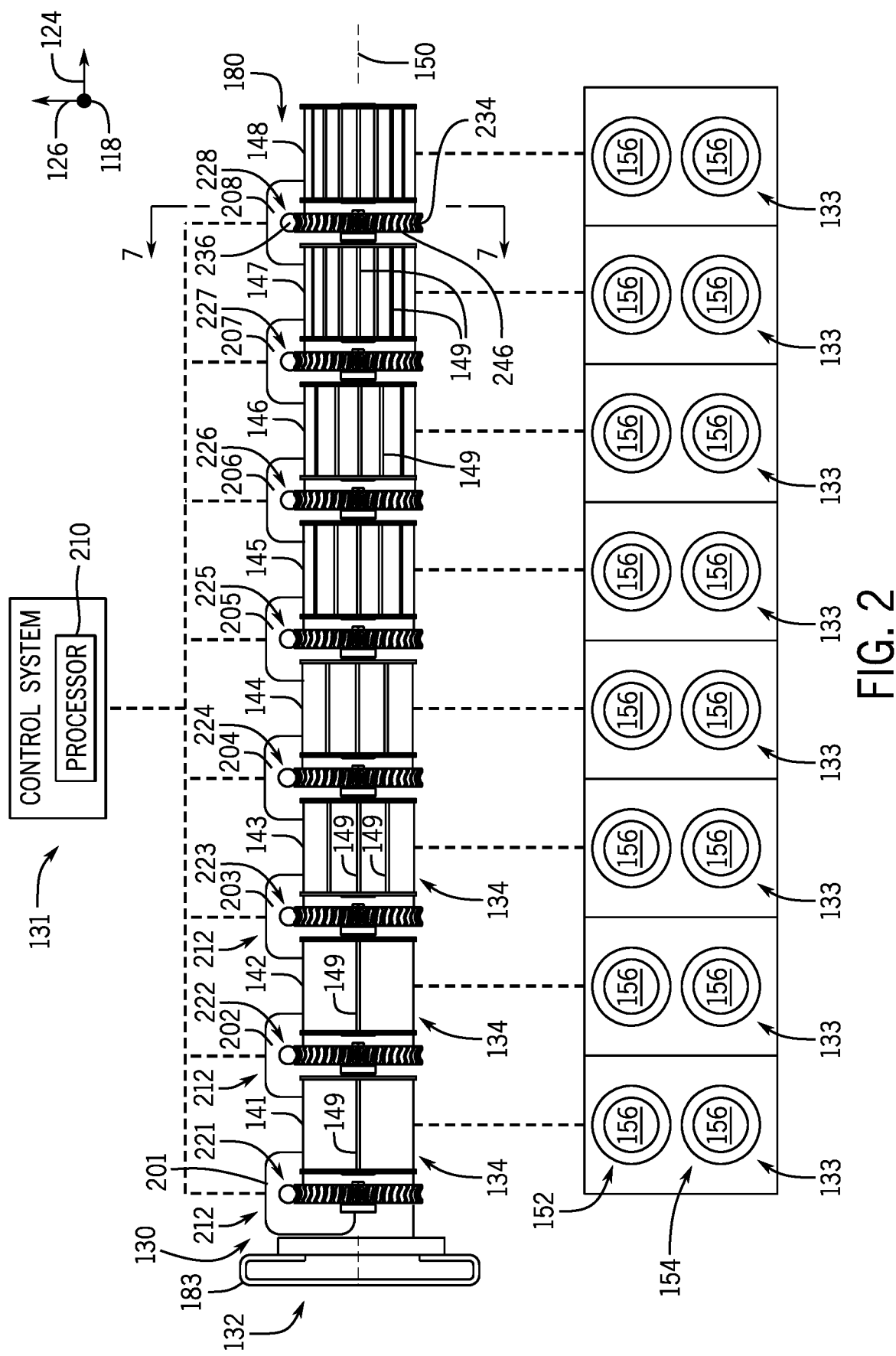
FIG. 2 is a schematic view of the metering system of the work vehicle of FIG. 1 according to example embodiments.

The metering system 130 and the delivery system 132 are shown schematically in FIG. 2 according to example embodiments. As shown, the metering system 130 may include a plurality of metering elements 134. In some embodiments, the metering elements 134 may comprise metering rollers, such as a first metering roller 141, a second metering roller 142, a third metering roller 143, a fourth metering roller 144, a fifth metering roller 145, a sixth metering roller 146, a seventh metering roller 147, and an eighth metering roller 148. The metering rollers 141-148 may be substantially cylindrical and may include flutes 149 that project radially outward. There may be any number of flutes 149, and FIG. 2 illustrates a variety of arrangements with the first and second metering rollers 141, 142 having the fewest flutes 149 and the seventh and eighth metering rollers 147, 148 having the most. As will be discussed, the metering elements 134 may be interchangeable. Thus, a user may install metering elements 134 with the number of flutes 149 that provide a desired metering rate for the commodity. The metering elements 134 may also be replaced with a different diameter in some embodiments to change the predetermined metering rate.

The metering rollers 141-148 may be substantially coaxial and supported for rotation about a first axis 150. The first axis 150 may extend substantially parallel to the lateral axis 124. As the rollers 141-148 rotate about the first axis 150, metered commodity may move toward the delivery system 132.

The tubes 133 of the delivery system 132 may be supported below the metering rollers 141-148. This portion of the tubes 133 may define a delivery passage 156 that extends along a delivery axis that is substantially parallel to the longitudinal axis 118 of the work vehicle 100. Accordingly, in some embodiments, the first axis 150 may be substantially perpendicular to the axis of the tubes 133.

As shown in FIG. 2, the plurality of tubes 133 may be operatively connected to corresponding ones of the metering rollers 141-148. For example, the plurality of tubes 133 may be arranged in an upper row 152 and a lower row 154. Each metering roller 141-148 may be fluidly connected to one of the tubes 133 of the upper row 152 and one of the tubes 133 of the lower row 154. This fluid connection is represented in FIG. 2 with vertical broken lines extending between the metering system 130 and the delivery system 132. Thus, as the metering rollers 141-148 about the axis 150, the metered commodity may be provided to the tubes 133 of the upper row 152 and/or the tubes 133 of the lower row 154. It will be appreciated that the work vehicle 100 may additionally include valve structures and/or other components for directing the commodity to the upper row 152 and/or the lower row 154.

Figure 3:
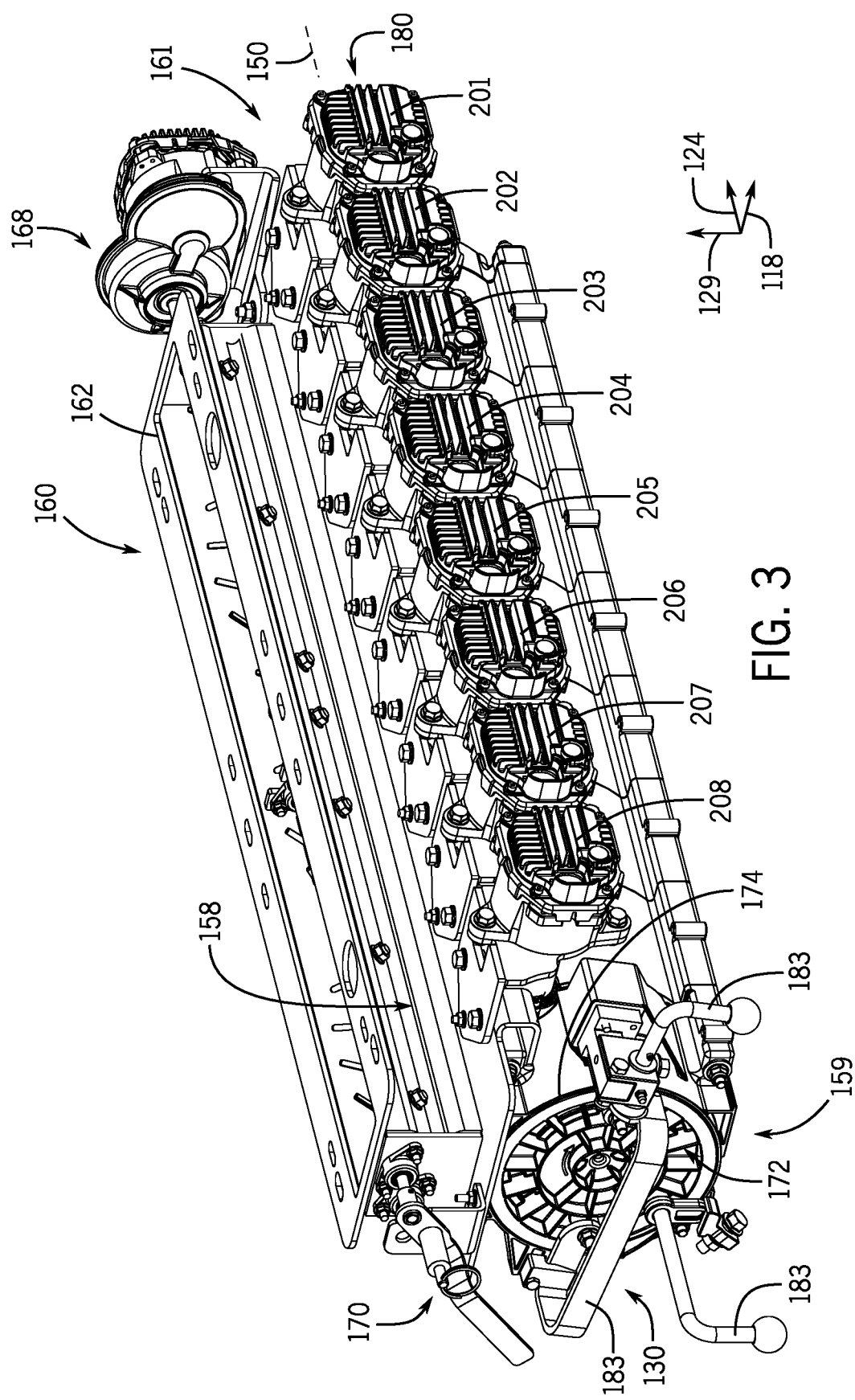
FIG. 3 is an isometric view of the metering system of the work vehicle of FIG. 1 according to example embodiments.
Figure 4:
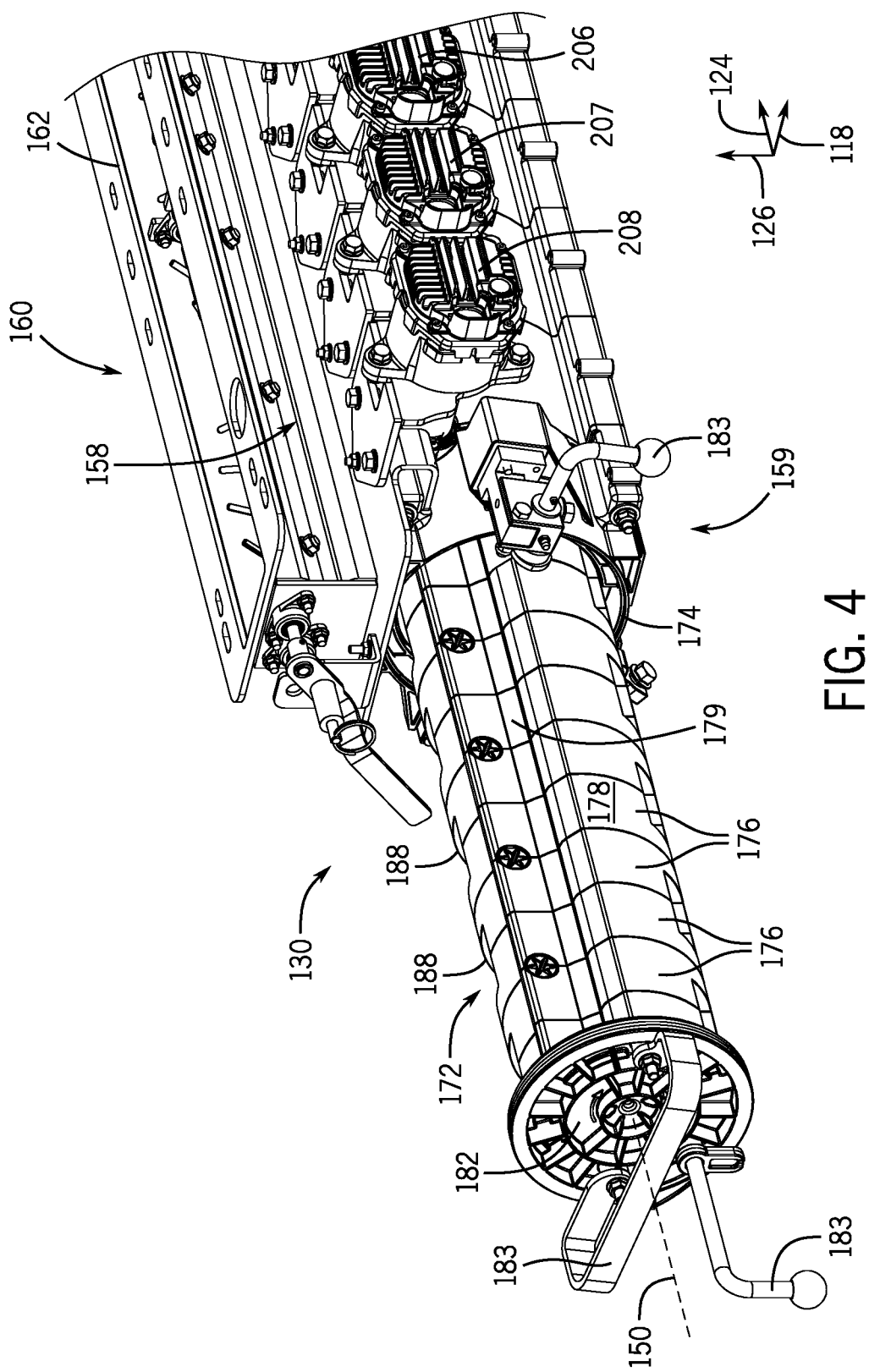
FIG. 4 is an isometric view of the metering system of FIG. 3, wherein a cartridge of the metering system is shown withdrawn from a metering frame.

Referring now to FIGS. 3 and 4, additional features of the work vehicle 100, the metering system 130, and other components will be discussed in further detail according to example embodiments. As shown, the work vehicle 100 may include a metering frame 158 (i.e., a metering support structure). The metering frame 158 may support and/or define portions of the metering system 130. The metering frame 158 may be an assembly of rigid and strong components. The metering frame 158 may be constructed of metal, such as aluminum or steel in some embodiments. The metering frame 158 may be elongate and may include a first end 159 and a second end 161 that are separated apart along the lateral axis 124. In some embodiments, the metering frame 158 may include an upper end 160. The upper end 160 may define an inlet opening 162 that is open to one or more of the commodity containers 128 (FIGS. 2 and 3). Accordingly, particles of the commodity may flow from the container(s) 128 into the inlet opening 162. The metering frame 158 may also include a lower end that includes one or more openings that communicate with the delivery system 132 as depicted in FIG. 2.

As shown in FIG. 3, the work vehicle 100 may include an agitator system 168. The agitator system 168 may include an electric motor and an agitator shaft (not specifically shown) that are supported by the metering frame 158, proximate the inlet opening 162. The motor may rotate the shaft of the agitator system 168 to maintain flow of the commodity as it moves from the container 128 toward the metering system 130.

The work vehicle 100 may additionally include a shut off valve 170. The shut off valve 170 may be supported by the metering frame 158, proximate the inlet opening 162. The shut off valve 170 may include a valve body and a handle that may be rotated (manually or automatically) to move valve body between a closed position and an open position. When open, the commodity from the commodity container 128 may flow downstream toward the metering system 130. When closed, the shut off valve 170 may cut off the flow.

As shown in FIG. 4, the metering system 130 may include a cartridge assembly 172. The cartridge assembly 172 may be removably received within a side opening 174 of the metering frame 158. In some embodiments, the cartridge assembly 172 may be elongate and somewhat cylindrical. An outer surface of the cartridge assembly 172 may include a rounded portion 178 and an indented portion 179. The indented portion 179 may be an elongated groove that extends along the lateral axis 124. The cartridge assembly 172 may move between an installed position (FIG. 3) and a removed position (FIG. 4). In some embodiments, the cartridge assembly 172 may rotate (e.g., a quarter turn) relative to the metering frame 158 about the first axis 150 and/or may slide longitudinally relative to the metering frame 158 during installation/removal. The cartridge assembly 172 may also include one or more handles 183 for manually installing/removing the cartridge assembly 172. One handle 183 may be used to push and/or pull the cartridge assembly 172 relative to the metering frame 158. Other handles may be used to manually and selectively actuate a retainer (e.g., one or more clamps, latches, fasteners, etc.) that removably fix the cartridge assembly 172 to the metering frame 158 in the installed position shown in FIG. 3. The handle 183 may be manually turned, for example, to attach the cartridge assembly 172 to the metering frame 158, and the handle 183 may be turned in an opposite direction to detach the cartridge assembly 172. Once detached, the cartridge assembly 172 may be removed from the metering frame 158 as will be discussed in greater detail below.

The cartridge assembly 172 may also include an end cap 182. The end cap 182 may be a circular disc and may cover over the side opening 174 when the cartridge assembly 172 is installed (FIG. 3). In some embodiments, the end cap 182 may seal against the metering frame 158 when installed.

As shown in FIGS. 4-7, the cartridge assembly 172 may include a plurality of cover members 176. The cover members 176 may be substantially annular and may be aligned along the first axis 150. When assembled together, the cover members 176 may collectively define a hollow, cylindrical body, including the rounded portion 178 and the indented portion 179 of the cartridge assembly 172. Neighboring cover members 176 may also define a plurality of commodity openings 188, each of which is open to the interior of the cartridge assembly 172.

Figure 5:
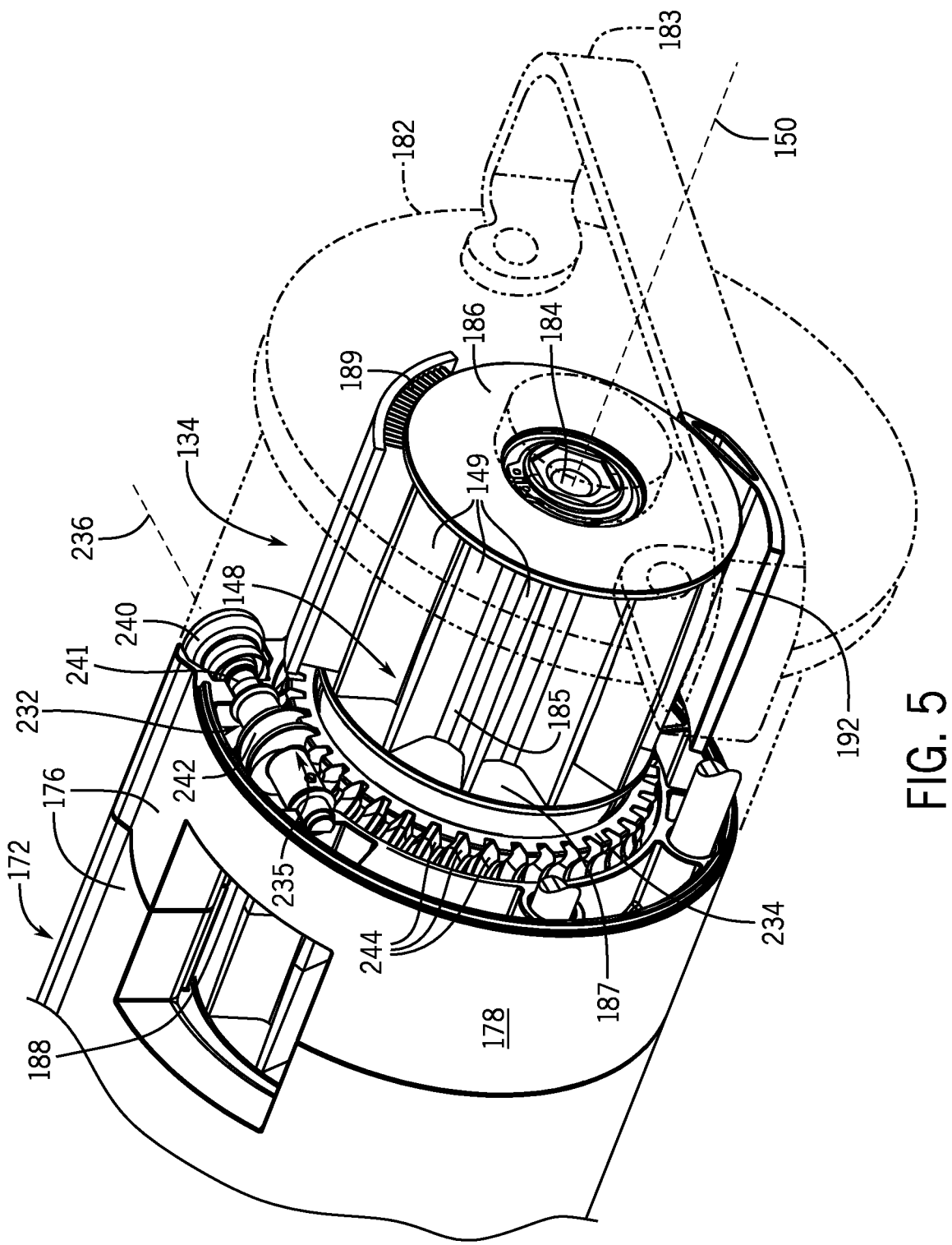
FIG. 5 is an isometric view of a portion of the cartridge of FIG. 4 as well as a metering roller and a transverse drive configured for rotating the metering roller according to example embodiments.

The end cap 182 and one of the cover members 176 is hidden from view in FIG. 5 to reveal the interior of the cartridge assembly 172. As shown, the cartridge assembly 172 may include the plurality of metering elements 134 discussed above in relation to FIG. 2. One of the metering elements 134 (e.g., the eighth metering roller 148) is shown in FIG. 5, and it will be appreciated that the eighth metering roller 148 may be representative of the other metering rollers 141-147. The metering roller 148 may be supported, along with the other metering elements 134, on a metering shaft 184. The metering shaft 184 may be centered on the first axis 150. The metering roller 148 may be mounted (e.g., via a bearing) on the shaft 184 and may rotate relative to the shaft 184 about the first axis 150.

As shown in FIG. 5, the metering roller 148 may include a roller body 185 that extends between a first end 186 and a second end 187. The metering roller 148 may also include the flutes 149, which were mentioned above. In some embodiments, the flutes 149 may extend between the first end 186 and the second end 187. It should be noted that, while the illustrated examples have one sent of like flutes per roller body, in some embodiments, a single roller body may support multiple metering features, such as having the same or a different count and/or configuration of flutes.

Furthermore, the cartridge assembly 172 may include one or more brushes 189. The brushes 189 may be supported by the cover member 176 and may include bristles that abut against the flutes 149 as the metering roller 148 rotates about the axis 150. Additionally, the cartridge assembly 172 may include a lip member 192. The lip member 192 may be supported by the cover member 176 on a side of the axis 150 that is opposite the commodity opening 188. Thus, as commodity enters the opening 188 from the commodity container 128, the metering roller 148 may rotate about the axis 150. The flutes 149 may move the commodity over the lip member 192 and out of the cartridge assembly 172. This metered commodity may exit the metering frame 158 and move toward the delivery system 132 as discussed above.

Figure 7:
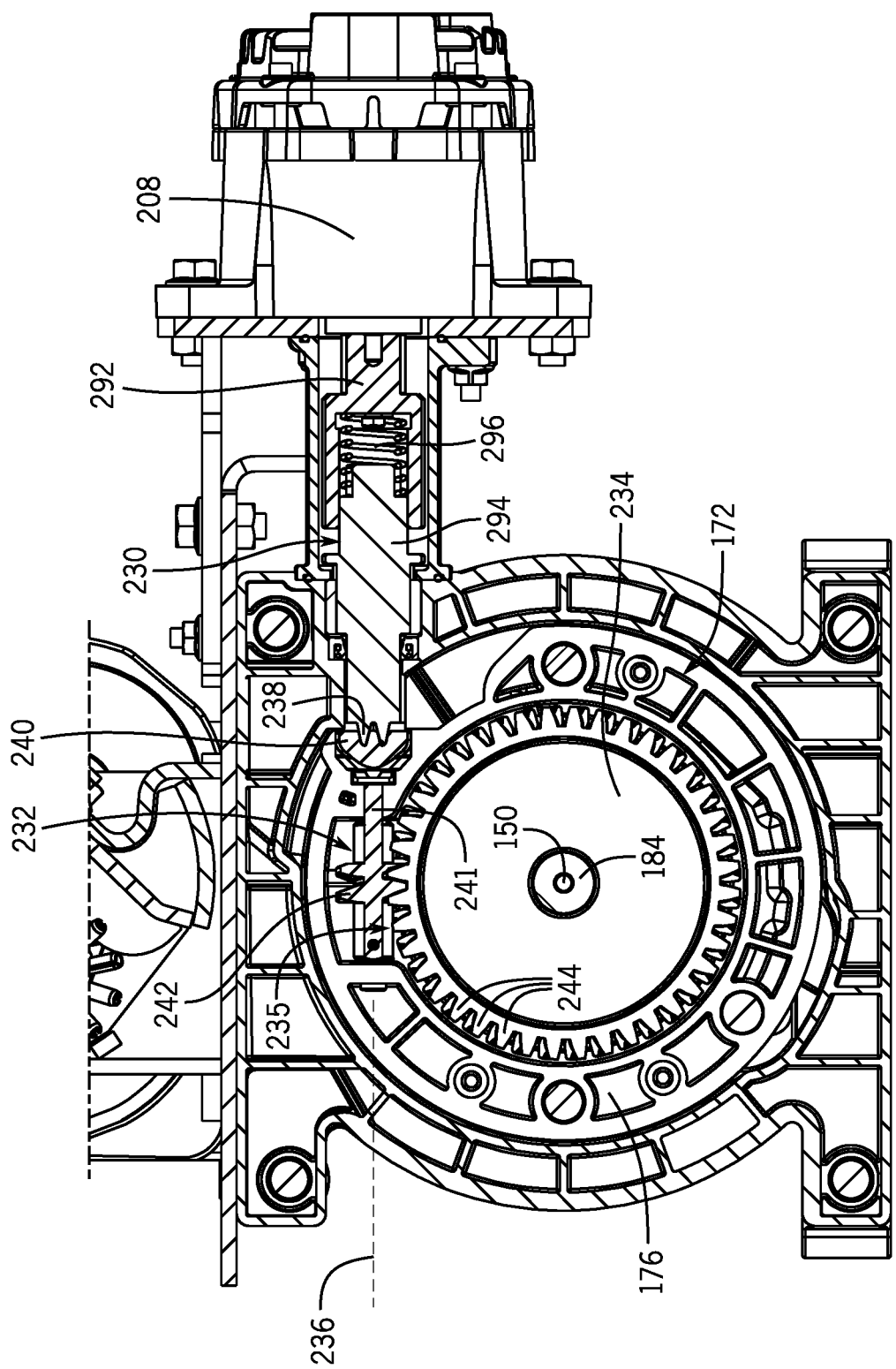
FIG. 7 is a section view of the transverse drive taken along the line 7-7 of FIG. 2.

As shown in FIGS. 3, 4, and 7, the work vehicle 100 may also include a plurality of actuators 180. In some embodiments, there may be at least one actuator 180 corresponding to each of the plurality of metering rollers; therefore, the work vehicle 100 may include a first actuator 201, a second actuator 202, a third actuator 203, a fourth actuator 204, a fifth actuator 205, a sixth actuator 206, a seventh actuator 207, and an eighth actuator 208. The actuators 201-208 may be of any suitable type, such as electric motors in some embodiments. However, it will be appreciated that the actuators may be hydraulic actuators or other types without departing from the scope of the present disclosure. In some embodiments, the actuators 201-208 may be fixedly attached to the metering frame 158 (FIG. 3). Also, the actuators 201-208 may be substantially aligned and attached along one side (the front or rear side) of the metering frame 158.

As will be discussed, the first actuator 201 may be operatively connected to the first metering roller 141 for drivingly rotating the first metering roller 141 about the first axis of rotation 150. Similarly, the second actuator 202 may be operatively connected to the second metering roller 202 for drivingly rotating the second metering roller 142 about the first axis 150. Likewise, the third actuator 203 may be operatively connected to the third metering roller 143, the fourth actuator 204 may be operatively connected to the fourth metering roller 144, the fifth actuator 205 may be operatively connected to the fifth metering roller 145, the sixth actuator 206 may be operatively connected to the sixth metering roller 146, the seventh actuator 207 may be operatively connected to the seventh metering roller 147, and the eighth actuator 208 may be operatively connected to the eighth metering roller 148. As such, the metering rollers 141-148 may be individually and independently actuated relative to each other. In some operating situations, the metering rollers 141-148 may operate simultaneously, but at different individual speeds. In other situations, one of the metering rollers 141-148 may operate while another metering roller 141-148 remains stationary.

The actuators 201-208 may be operatively connected to the control system 131. The control system 131 may include a processor 210. The processor 210 may comprise hardware, software, and/or firmware components configured to enable communications and/or interaction with the actuators 201-208. The control system 131 may also include a memory element (e.g., RAM memory, flash memory, EPROM memory, EEPROM memory, registers, a hard disk, a removable disk, a CD-ROM, or any other form of storage medium known in the art). In this regard, the memory element can be coupled to the processor 210 such that the processor 210 can read information from, and write information to, the memory element. In the alternative, the memory element may be integral to the processor 210. As an example, the processor 210 and the memory element may reside in an ASIC. The control system 131 may further include a user interface (U/I) with buttons, dials, displays, speakers, and/or other components which a user may manually input commands and/or receive output. Depending on the embodiment, the processor 210 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 210 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 210 may include processing logic that may be configured to carry out the functions, techniques, and processing tasks associated with the operation of the control system 131. Furthermore, the steps of a method or algorithm described in connection with the embodiments disclosed herein may be embodied directly in hardware, in firmware, in a software module executed by the processor 210, or in any practical combination thereof.

In some embodiments, during operation, the processor 210 may receive one or more input signals (e.g., a user command from a user interface, a signal from a sensor indicating a sensed condition, etc.). The processor 200 may rely on the input signals as well as predetermined computer logic to generate and output control commands for the actuators 201-208. The processor 200 may output different control signals for different ones of the actuators 201-208. Thus, the metering rollers 141-148 may rotate independently and at different speeds in some situations. As an example, if the work vehicle 100 turns within the field, the control system 131 may rotate the first metering roller 141 faster than the eighth metering roller 148 or vice versa to accommodate for the turn and to maintain a consistent metering rate for the plurality of metering elements 134. It will be appreciated that the control system 140 may independently control the actuators 201-208 in additional ways as well without departing from the scope of the present disclosure.

The work vehicle may further include a plurality of powertrains 212 that are configured to transmit power (e.g., rotational power) from one of the actuators 180 to one of the metering elements 134. As shown in FIG. 2, there may be a first powertrain 221 that operably connects the first actuator 201 to the first metering roller 141, a second powertrain 222 that operably connects the second actuator 202 to the second metering roller 142, a third powertrain 223 that operably connects the third actuator 203 to the third metering roller 143, a fourth powertrain 224 that operably connects the fourth actuator 204 to the fourth metering roller 144, a fifth powertrain 225 that operably connects the fifth actuator 205 to the fifth metering roller 145, a sixth powertrain 226 that operably connects the sixth actuator 206 to the sixth metering roller 146, a seventh powertrain 227 that operably connects the seventh actuator 207 to the seventh metering roller 147, and an eighth powertrain 228 that operably connects the eighth actuator 208 to the eighth metering roller 148. At least one of the powertrains 221-228 may comprise a geartrain that includes an interconnected set of shafts, gears and/or other mechanical drive components.

In some embodiments, the powertrains 221-228 may be substantially similar to each other. Thus, to avoid redundancy, the eighth powertrain 228 will be discussed as a representative example of the others.

Figure 6:
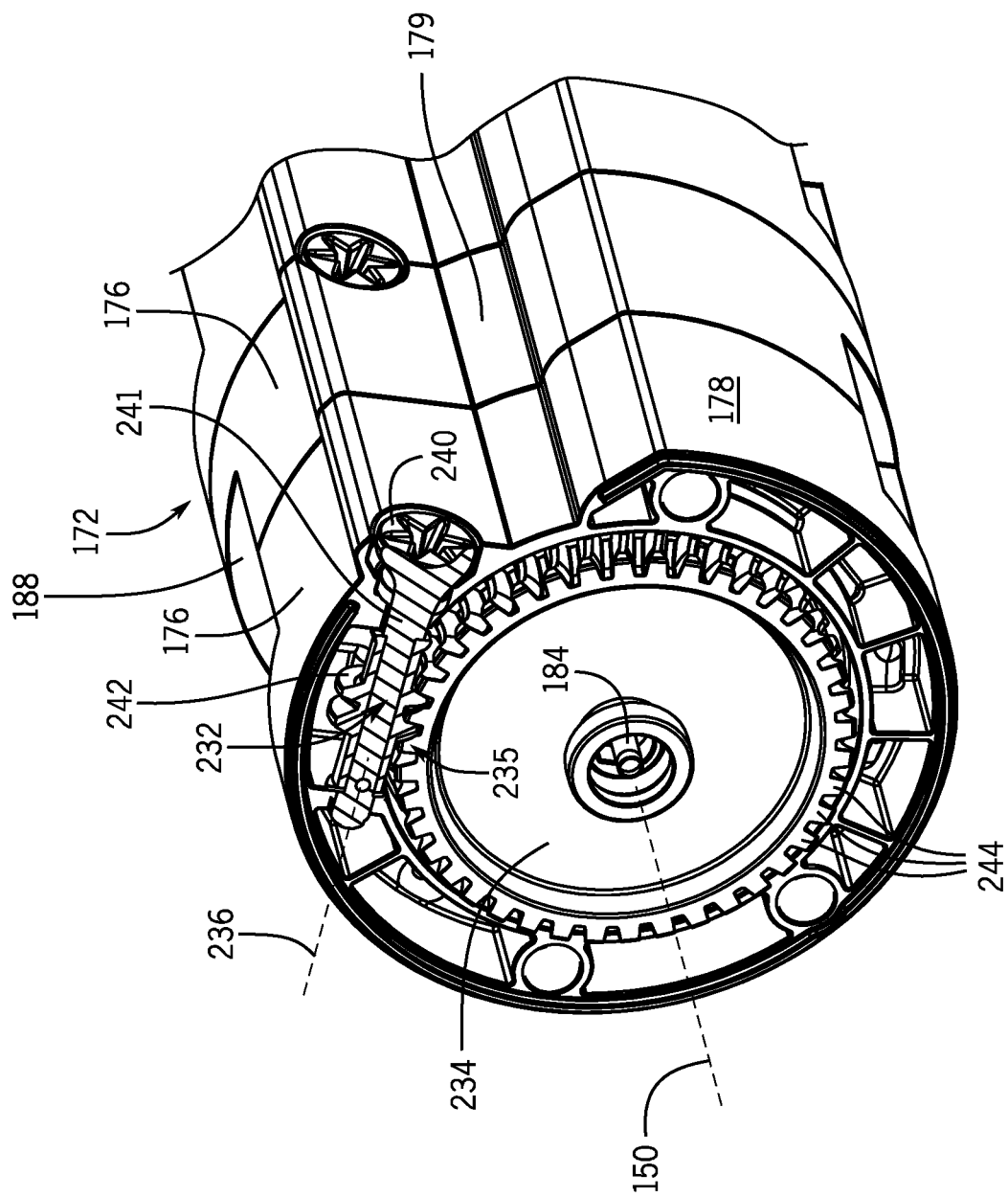
FIG. 6 is an isometric view of the transverse drive of FIG. 5.

As shown in FIG. 7, the powertrain 228 may generally include an actuator shaft assembly 230, a worm screw 232, and a worm wheel 234. One end of the actuator shaft assembly 230 may be connected to the actuator 208 to be driven in rotation about a second axis 236. The other end of the actuator shaft assembly 230 may include a first connector 238. In some embodiments, the first connector 238 may be a male-type connector, such as a Phillips screwdriver head connector. The actuator shaft assembly 230 may be supported by the metering frame 158. The worm screw 232 may be supported for rotation about the second axis 236 by the cartridge assembly 172. The worm screw 232 may be received between and supported by neighboring cover members 176, within the indented portion 179 as shown in FIGS. 4 and 6. The worm screw 232 may include a second connector 240 that removably receives the first connector 238. The worm screw 232 may also include a shaft 241 and a threading 242 that projects from the shaft 241 and that extends helically about the second axis 236. The worm wheel 234 may be disc-shaped and/or shaped like a spur gear. The worm wheel 234 may include a plurality of gear teeth 244 that project radially away from an outer diameter portion of the worm wheel 234. As shown in FIGS. 2 and 5, one longitudinal face of the worm wheel 234 may be fixed to the second end 187 of the metering roller 148, and as shown in FIG. 2, an opposing longitudinal face 246 may face away from the metering roller 148. The worm wheel 234 may be integrally connected to the metering roller 148 in some embodiments so as to be a one-piece, unitary part. In other embodiments, the worm wheel 234 may be detachably connected to the metering roller 148. The worm wheel 234 may be supported for rotation as a unit with the metering roller 148 on the shaft 150 for rotation about the first axis 150. The gear teeth 244 of the worm wheel 234 may be enmeshed and threadably engaged with the threading 242 of the worm screw 232.

During operation, the actuator 208 may drivingly rotate the actuator shaft assembly 230 and the worm screw 232 about the second axis 236. The rotation of the worm screw 232 may power rotation of the worm wheel 234 and the metering roller 148 about the first axis 150. The other actuators 201-207 may drive the respective metering rollers 141-147 in a similar fashion.

It will be appreciated that the worm screw 232 and the worm wheel 234 may collectively define a so-called worm drive 235 that turns the power delivery path through the powertrain 228. Stated differently, the first axis 150 is transverse (e.g., substantially perpendicular) to the second axis 236 due to the inclusion of the worm drive 235. Power is transmitted from the actuator 208 through the powertrain 228 along the second axis 236, and the power delivery path turns ninety degrees to be delivered along the first axis 150. In the illustrated embodiments, the worm screw 232 is oriented substantially along the longitudinal axis 118 of the work vehicle, and the axis 150 is oriented laterally. In additional embodiments, the worm screw 232 may be oriented vertically along the axis 126, and the axis 150 may be oriented laterally. The power delivery path from the worm screw 232 to the worm wheel 234 is nonplanar (i.e., out-of-plane). For example, power is delivered along the plane of the paper in FIG. 7 and then turns normal to the page as it transfers from the worm screw 232 to the worm wheel 234. Furthermore, it will be appreciated that the worm screw 232 may be referred to as an "actuator output member" and the worm wheel 234 may be referred to as a "metering input member" since power output from the worm screw 232 is input to the worm wheel 234.

Figure 8:
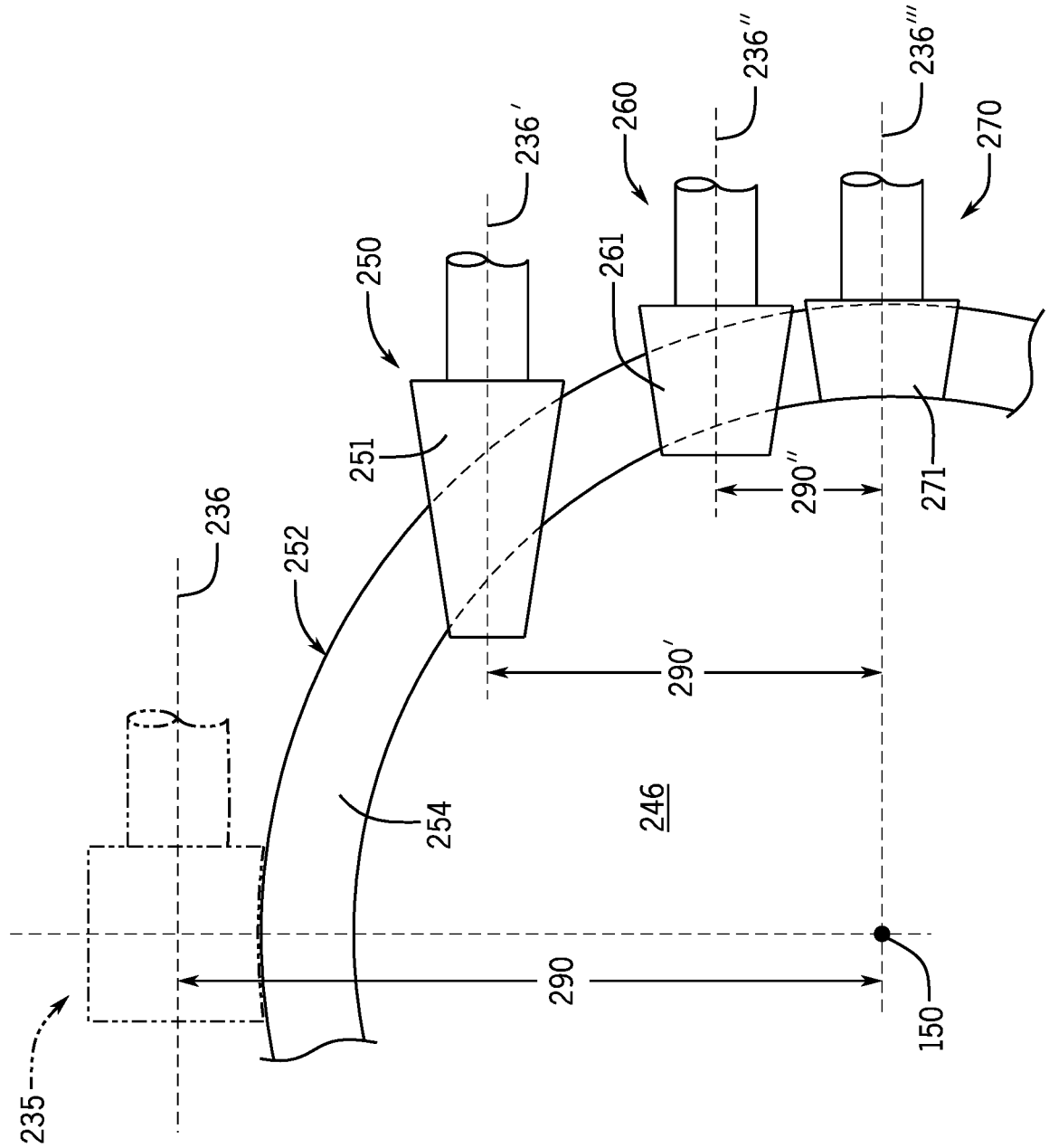
FIG. 8 is a schematic view of a plurality of different transverse drives for the metering system of the present disclosure.

FIG. 8 schematically illustrates a variety of transverse drives that may be used as alternatives to the worm drive 235 discussed above. In one alternative, the worm drive 235 is replaced by a spiroid drive 250 that comprises a spiroid gear 251 and a ring gear 252. The spiroid gear 251 may be connected to the actuator 208, and the gear 252 may be connected to the metering roller 148. The spiroid gear 251 may be enmeshed with gear teeth 254 included on the end face 246 of the gear 252. As another alternative, the powertrain 228 may include a hypoid drive 260 that comprises a hypoid gear 261 and the ring gear 252. As a further alternative, the powertrain 228 may include a spiral bevel drive 270 that comprises a spiral bevel gear 271 and the ring gear 252. It will be appreciated that the dimensions and arrangement of the gear teeth may differ in these alternative configurations. Also, the relative position of the axes of rotation may differ in the different alternatives. For example, with the worm drive 235, the first axis 150 may be spaced apart at a distance 290 from the second axis 236 such that the axes 150, 236 do not intersect. With the spiroid drive 250, the first axis 150 may be spaced apart at a distance 290' away from the second axis 236' such that the axes 150, 236' do not intersect. With the hypoid drive 260, the first axis 150 may be spaced apart at a distance 290" away from the second axis 236" such that the axes 150, 236" do not intersect. Also, with the bevel drive 270, the first axis 150 may intersect the second axis 236'''. In some embodiments, the axes 150, 236''' of the bevel drive 270 may be disposed at a non-orthogonal angle in some embodiments of the present disclosure. However, in each of these alternatives, power may be transmitted from the actuator 208 along one axis and then turned out-of-plane to drivingly rotate the gear 252 and, ultimately, the metering roller 148.

The powertrain 212 may provide a predetermined gear reduction ratio. In some embodiments, the powertrain 212 provides a 40:1 gear reduction; however, it will be appreciated that the powertrain 212 may be configured otherwise without departing from the scope of the present disclosure.

As mentioned above, the cartridge assembly 172 may move between an installed position (FIG. 3) and a removed position (FIG. 4). For example, the cartridge assembly 172 may be removed for servicing, repairing, reconfiguring, and/or replacing components. A user may remove the cartridge assembly 172 and remove and replace one or more of the metering rollers 141-148. Specifically, in some situations, at least one metering roller 141-148 with one arrangement of flutes 149 may be replaced with another roller 141-148 with a different arrangement of flutes 149. Likewise, at least one roller 141-148 having a certain diameter may be replaced with another roller having a different diameter. These changes may be made to affect the metering rate provided by the metering system 130. Also, these changes may be based on the type of commodity being metered by the metering system 130.

The powertrain 212 may include one or more features that facilitate installation and/or removal. For example, as shown in FIG. 7, the actuator shaft assembly 230 may include a base 292, a shank 294, and a biasing member 296. The base 292 may be attached to the actuator 208 and may extend along the axis 236. The shank 294 may be partially received within the base 292 and may partially extend out of the base 292 along the axis 236. The first connector 238 may be included on the end of the shank 294 that is opposite the base 292. The biasing member 296 may be received within the base 292 and disposed between the base 292 and the shank 294. In some embodiments, the biasing member 296 may be a compression spring that biases the shank 294 outward along the axis 236, away from the base 292.

When the cartridge assembly 172 is installed as shown in FIG. 7, the biasing member 296 may bias the first connector 238 toward the second connector 240 to maintain engagement. This may be referred to as the engaged position of the cartridge assembly 172. To remove the cartridge assembly 172 from the metering frame 158, the cartridge assembly 172 may be rotated about the axis 150, thereby rotating the second connector 240 away from the first connector 238 and disengaging the pair. This may be referred to as a disengaged position of the cartridge assembly 172. Once disengaged, the cartridge assembly 172 may slide along the first axis 150 to be removed from the metering frame 158. Then, to re-install the cartridge assembly 172, the cartridge assembly 172 may slide into the side opening 174. Once fully advanced into the metering frame 158, the cartridge assembly 172 may be rotated such that the second connectors 240 receive and engage the first connectors 238. As stated, the biasing member 296 may bias the connectors 238, 240 toward this engaged position. It will be appreciated, however, that there may be other configurations for engaging and disengaging the powertrain 228. For example, there may be a mechanism that may be manually used to selectively engage and disengage the first and second connectors 238, 240 without departing from the scope of the present disclosure.

Accordingly, the metering system 130 may provide accurate and effective commodity metering. The metering rollers 141-148 may be independently actuated in some embodiments. Also, the metering rollers 141-148 may be interchanged and replaced with a large number of roller variations such that the metering system 130 is highly configurable and variable according to operating conditions. Regardless, the metering system 130 may remain relatively compact and well-organized since the powertrains 212 turn the power delivery path out-of-plane relative to the first axis of rotation 150.

Also, the following examples are provided, which are numbered for easier reference.

1. A work vehicle comprising: an actuator; a metering element; and a powertrain configured to transmit power from the actuator to the metering element to drive the metering element in rotation about a first axis to meter a commodity at a predetermined rate; the powertrain including an actuator output member supported for rotation about a second axis; the powertrain including a metering input member that is fixed for rotation with the metering element about the first axis; the actuator output member engaged with the metering input member for power transmission from the actuator output member to the metering input member; and the first axis being transverse to the second axis.

2. The work vehicle of example 1, wherein the first axis is substantially perpendicular to the second axis.

3. The work vehicle of example 2, wherein the first axis and the second axis are spaced apart at a distance.

4. The work vehicle of example 2, wherein the first axis intersects the second axis.

5. The work vehicle of example 1, wherein the metering element includes a metering roller; wherein the metering input member is integrally attached to the metering roller to be unitary with the metering roller.

6. The work vehicle of example 1, wherein the metering input member comprises a worm wheel and a plurality of input gear teeth that extend radially from the worm wheel; and wherein the actuator output member comprises a worm screw with a shaft and a threading that meshes with the input gear teeth.

7. The work vehicle of example 1, wherein the metering input member comprises a gear with a longitudinal face that includes a plurality of input gear teeth; and wherein the actuator output member comprises a shaft and a plurality of output gear teeth that are enmeshed with the input gear teeth.

8. The work vehicle of example 1, wherein the actuator is a first actuator and further comprising a second actuator; wherein the metering element is a first metering element and further comprising a second metering element; wherein the powertrain is a first powertrain, wherein the actuator output member is a first actuator output member, and wherein the metering input member is a first metering input member; further comprising a second powertrain configured to transmit power from the second actuator to the second metering element to drive the second metering element in rotation about the first axis; the second powertrain including a second actuator output member supported for rotation about a third axis; the second powertrain including a second metering input member that is fixed for rotation with the second metering element about the first axis; the second actuator output member engaged with the second metering input member for power transmission from the second actuator output member to the second metering input member; wherein the first axis is transverse to the third axis; and wherein the first actuator is configured to actuate the first metering element independent of the second actuator actuating the second metering element.

9. The work vehicle of example 8, wherein the first metering element, the first metering input member, the second metering element, and the second metering input member are arranged in a cartridge that is selectively removable from the work vehicle; wherein the cartridge has an engaged position and a disengaged position; wherein, in the engaged position, the first metering element is operably connected to the first actuator for power transmission via the first powertrain and the second metering element is operably connected to the second actuator for power transmission via the second powertrain; and wherein, in the disengaged position, the first metering element is disconnected from the first actuator and the second metering element is disconnected from the second actuator.

10. The work vehicle of example 9, wherein the cartridge is rotatable about the first axis to move between the engaged position and the disengaged position.

11. The work vehicle of example 9, wherein the cartridge is selectively removable from a support structure; wherein the first powertrain includes a first connector supported by the cartridge and a second connector supported by the support structure; wherein the first connector and the second connector are engaged in the engaged position; wherein the first connector and the second connector are disengaged in the disengaged position; and further comprising a biasing member that biases the first connector and the second connector towards engagement.

12. The work vehicle of example 8, further comprising a delivery system with a delivery passage that is configured to receive the commodity metered from the metering element; and wherein the delivery passage extends along a delivery axis that is substantially perpendicular to the first axis.

13. The work vehicle of example 8, further comprising a control system with a processor configured to generate a first control command for the first actuator for actuating the first metering element; and wherein the processor is configured to generate a second control command for the second actuator for actuating the second metering element independent of the first metering element.

14. A work vehicle comprising: a metering system comprising a plurality of metering elements that are coaxial with respect to a first axis and that are supported for rotation about the first axis to meter out a commodity from the metering system; and an actuator system with a plurality of actuators, the plurality of actuators operably connected to respective ones of the plurality of metering elements, the actuator system configured to independently actuate the plurality of metering elements.

15. A work vehicle comprising: an actuator system with a plurality of actuators; a metering system with a support structure and a cartridge assembly that is removably attached to the support structure, the cartridge assembly moveable between an engaged position and a disengaged position relative to the support structure, the cartridge assembly including a plurality of metering elements supported for rotation about a first axis to meter out a commodity from the metering system; and a plurality of powertrains that operably connect the plurality of actuators to respective ones of the metering elements for power transfer from the plurality of actuators to the respective metering elements; at least one of the plurality of powertrains including a first connector supported by the cartridge assembly and a second connector supported by the support structure; wherein the first connector and the second connector are engaged in the engaged position; wherein the first connector and the second connector are disengaged in the disengaged position.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle comprising:
   a first actuator and a second actuator;
   a first metering element and a second metering element; and
   a first powertrain and a second powertrain configured to transmit power, respectively, from the first actuator and the second actuator to the first metering element and the second metering element to drive the respective first metering element and the second metering element in rotation about a first axis to meter a commodity;
   the first powertrain and the second powertrain including, respectively, a first actuator output member and a second actuator output member supported for rotation about respective second and third axes;
   the first powertrain and the second powertrain including, respectively, a first metering input member and a second metering input member fixed for rotation with the respective first metering element and the second metering element about the first axis;
   the first actuator output member and the second actuator output member engaged, respectively, with the first metering input member and the second metering input member for power transmission from the first actuator output member and the second actuator output member to the respective first metering input member and the second metering input member; and
   the first axis being transverse to the second and third axes.

2. The work vehicle of claim 1, wherein the first axis is substantially perpendicular to the second axis.

3. The work vehicle of claim 2, wherein the first axis and the second axis are spaced apart at a distance.

4. The work vehicle of claim 2, wherein the first axis intersects the second axis.

5. The work vehicle of claim 1, wherein each of the first metering element and the second metering element includes a metering roller;
   wherein each of the first metering input member and the second metering input member is integrally attached to the metering roller to be unitary with the metering roller.

6. The work vehicle of claim 1, wherein each of the first metering input member and the second metering input member comprises a worm wheel and a plurality of input gear teeth that extend radially from the worm wheel; and
   wherein each of the first actuator output member and the second actuator output member comprises a worm screw with a shaft and a threading that meshes with the input gear teeth.

7. The work vehicle of claim 1, wherein each of the first metering input member and the second metering input member comprises a gear with a longitudinal face that includes a plurality of input gear teeth; and
   wherein each of the first actuator output member and the second actuator output member comprises a shaft and a plurality of output gear teeth that are enmeshed with the input gear teeth.

8. The work vehicle of claim 1,
   wherein the first actuator is configured to actuate the first metering element independent of the second actuator actuating the second metering element.

9. The work vehicle of claim 8, wherein the first metering element, the first metering input member, the second metering element, and the second metering input member are arranged in a cartridge that is selectively removable from the work vehicle;
   wherein the cartridge has an engaged position and a disengaged position;
   wherein, in the engaged position, the first metering element is operably connected to the first actuator for power transmission via the first powertrain and the second metering element is operably connected to the second actuator for power transmission via the second powertrain; and
   wherein, in the disengaged position, the first metering element is disconnected from the first actuator and the second metering element is disconnected from the second actuator.

10. The work vehicle of claim 9, wherein the cartridge is rotatable about the first axis to move between the engaged position and the disengaged position.

11. The work vehicle of claim 9, wherein the cartridge is selectively removable from a support structure;
    wherein the first powertrain includes a first connector supported by the cartridge and a second connector supported by the support structure;
    wherein the first connector and the second connector are engaged in the engaged position;
    wherein the first connector and the second connector are disengaged in the disengaged position; and
    further comprising a biasing member that biases the first connector and the second connector towards engagement.

12. The work vehicle of claim 8, further comprising a delivery system with a delivery passage that is configured to receive the commodity metered from the metering element; and
    wherein the delivery passage extends along a delivery axis that is substantially perpendicular to the first axis.

13. The work vehicle of claim 8, further comprising a control system with a processor configured to generate a first control command for the first actuator for actuating the first metering element; and wherein the processor is configured to generate a second control command for the second actuator for actuating the second metering element independent of the first metering element.

14. A work vehicle comprising:

a metering system comprising a plurality of metering elements that are coaxial with respect to a first axis and that are supported for rotation about the first axis to meter out a commodity from the metering system; and an actuator system with a plurality of actuators, the plurality of actuators operably connected to respective ones of the plurality of metering elements, the actuator system configured to independently actuate the plurality of metering elements.

15. The work vehicle of claim 14, further comprising a powertrain configured to transmit power from one of the plurality of actuators to one of the plurality of metering elements to drive the one of the plurality of metering elements in rotation about the first axis;

the powertrain including an actuator output member supported for rotation about a second axis;

the powertrain including a metering input member that is fixed for rotation with the one of the plurality of metering elements about the first axis;

the actuator output member engaged with the metering input member for power transmission from the actuator output member to the metering input member; and the first axis being transverse to the second axis.

16. The work vehicle of claim 15, further comprising a delivery system with a delivery passage that is configured to receive the commodity metered from the one of the plurality of metering elements; and wherein the delivery passage extends along a delivery axis that is substantially perpendicular to the first axis.

17. A work vehicle comprising:

an actuator system with a plurality of actuators;

a metering system with a support structure and a cartridge assembly that is removably attached to the support structure, the cartridge assembly moveable between an engaged position and a disengaged position relative to the support structure, the cartridge assembly including a plurality of metering elements supported for rotation about a first axis to meter out a commodity from the metering system; and a plurality of powertrains that operably connect the plurality of actuators to respective ones of the metering elements for power transfer from the plurality of actuators to the respective metering elements;

at least one of the plurality of powertrains including a first connector supported by the cartridge assembly and a second connector supported by the support structure;

wherein the first connector and the second connector are engaged in the engaged position;

wherein the first connector and the second connector are disengaged in the disengaged position.

18. The work vehicle of claim 17, further comprising a biasing member that biases the first connector and the second connector towards engagement.

19. The work vehicle of claim 17, wherein the at least one powertrain includes an actuator output member supported for rotation about a second axis;

the at least one powertrain including a metering input member that is fixed for rotation with the metering element about the first axis;

the actuator output member engaged with the metering input member for power transmission from the actuator output member to the metering input member; and the first axis being transverse to the second axis.

20. The work vehicle of claim 19, wherein the first axis is substantially perpendicular to the second axis.

* * * * *